United States Patent [19]
Poll

[11] Patent Number: 5,224,554
[45] Date of Patent: Jul. 6, 1993

[54] PLANT TRANSPLANTER

[76] Inventor: Howard B. Poll, 707 Aster Ave., Holland, Mich. 49423

[21] Appl. No.: 875,355

[22] Filed: Apr. 29, 1992

Related U.S. Application Data

[62] Division of Ser. No. 613,227, Nov. 13, 1990, Pat. No. 5,159,887.

[51] Int. Cl.⁵ ............................................. A01B 15/00
[52] U.S. Cl. ................................... 172/772; 111/149; 172/719; 172/747; 172/753
[58] Field of Search ............... 111/149, 153, 154, 156; 172/176, 719, 772, 747, 753

[56]  References Cited

U.S. PATENT DOCUMENTS

| | | |
|---|---|---|
| 516,745 | 8/1894 | Pitt . |
| 1,003,846 | 9/1911 | Winebrenner ..................... 172/719 |
| 1,178,146 | 4/1916 | Flowers ............................. 172/719 |
| 1,657,944 | 10/1926 | Stocker et al. . |
| 1,963,036 | 6/1934 | Trolley . |
| 2,739,548 | 3/1956 | Poll . |
| 2,749,855 | 6/1956 | Guigas . |
| 2,831,442 | 4/1958 | Montquire . |
| 2,950,770 | 2/1958 | Wilson . |
| 2,960,944 | 11/1960 | Poll . |
| 3,094,082 | 6/1963 | Wilson . |
| 3,246,615 | 4/1966 | Poll . |
| 3,514,830 | 6/1970 | Takakita et al. ..................... 172/747 |
| 3,872,805 | 3/1975 | Kolk et al. . |
| 4,090,456 | 5/1978 | Morrison et al. . |
| 4,106,415 | 8/1978 | Hakli . |
| 4,112,857 | 9/1978 | Bradley . |
| 4,290,373 | 9/1981 | Boots et al. . |
| 4,321,972 | 3/1982 | Robertson et al. .................. 111/153 |
| 4,408,550 | 10/1983 | Ellis . |
| 4,440,101 | 4/1984 | Edwards et al. . |
| 4,742,785 | 5/1988 | Kolk et al. . |
| 4,889,472 | 2/1990 | Winter . |
| 5,025,736 | 6/1991 | Anderson ............................ 111/152 |

FOREIGN PATENT DOCUMENTS

| | | |
|---|---|---|
| 1038236 | 10/1976 | Canada . |
| 2307455 | 4/1975 | France . |
| 323547 | 9/1965 | Sweden . |
| 408618 | 9/1972 | U.S.S.R. . |

OTHER PUBLICATIONS

Holland, "Non Stick Shoe", Aug. 1991.
Best of Farm Show, "Poly Moldboard Liners", '89, Dec. 1988, p. 48.
"Ceramic Coulters", Power Farming, vol. 64, No. 8, p. 34, Aug. 1985.
Mechanical Transplanter Company—Model 4000.
Holland Transplanter—Planter w/ front wheel direct drive.
Lannen Tehtaat Oy—RT-2.
Mechanical Transplanter—Model 6000.
Lannen, The Accelerated Transplant System.
Holland Transplanter Catalog.
Moorehouse Gyro Rotary Transplanter.
Allis–Chalmers Brochure Jan. 1979, "Row Crop Planters".
Yetter Row Crop Planter Units, Oct. 1988.

Primary Examiner—Dennis L. Taylor
Assistant Examiner—Spencer Warnick
Attorney, Agent, or Firm—Price, Heneveld, Cooper, DeWitt & Litton

[57]  ABSTRACT

A transplanter is disclosed which provides uniform planting without damaging plants. The transplanter includes a mechanism for receiving plants and depositing them in a furrow formed by a unique furrow opening shoe having a polymer outer layer which does not accumulate dirt thereon. A projecting ridge is provided for protecting the layer.

5 Claims, 4 Drawing Sheets

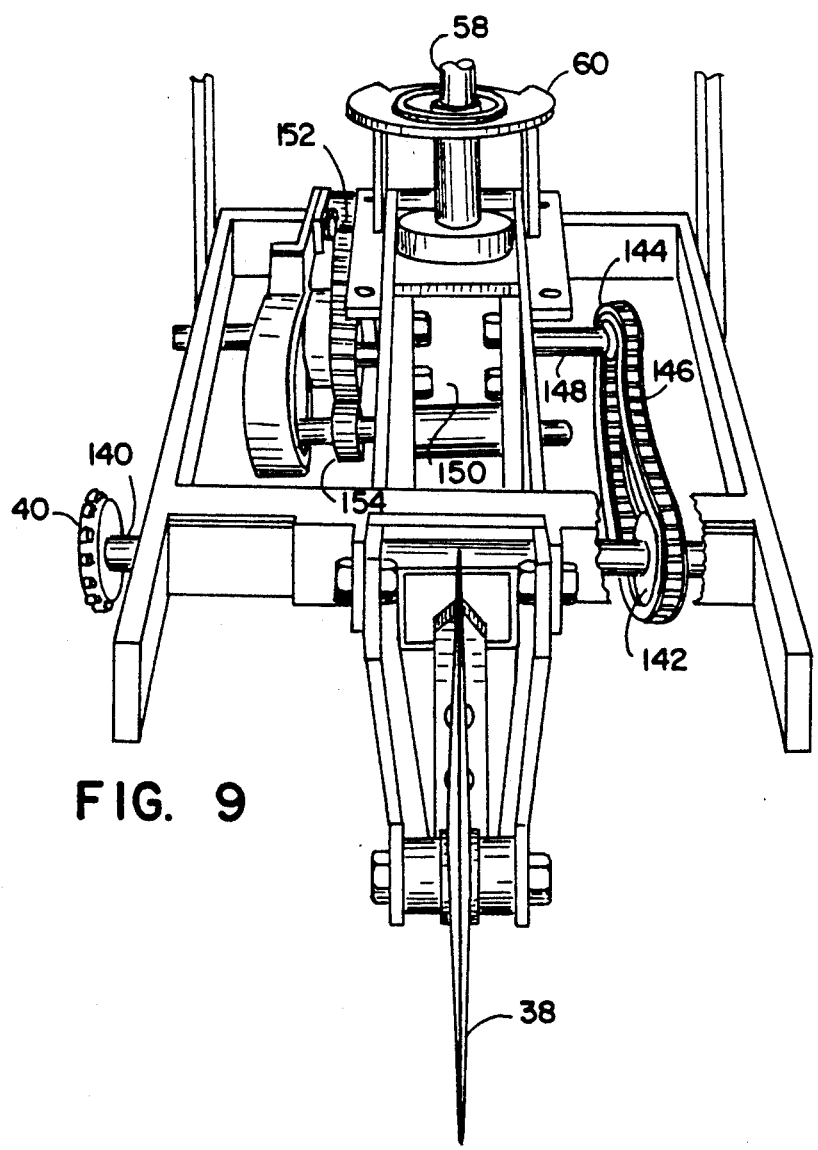
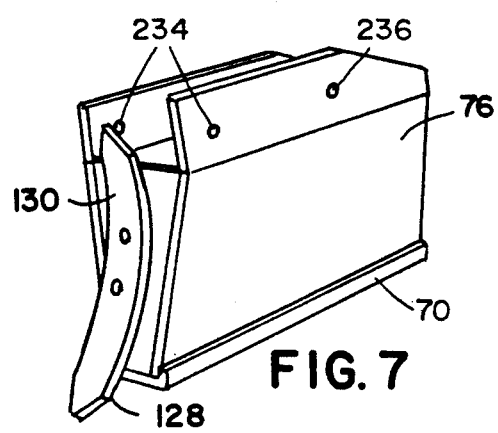
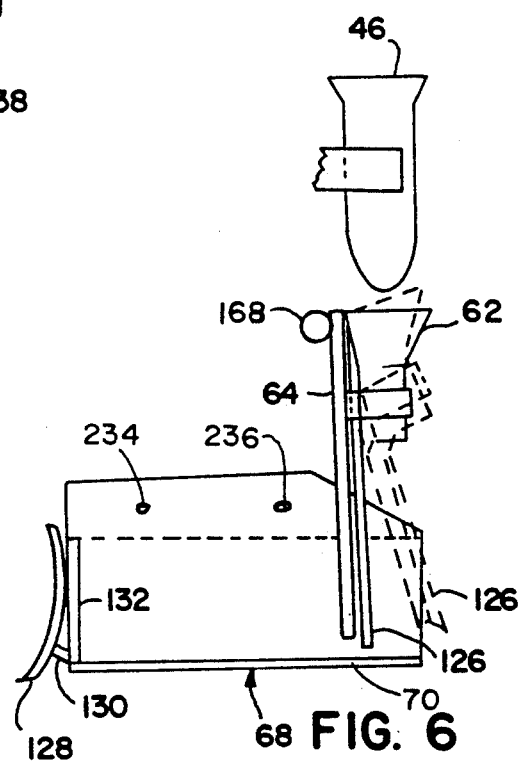

PLANT TRANSPLANTER

This is a division of application Ser. No. 07/613,227, entitled PLANT TRANSPLANTER, filed Nov. 13, 1990, now U.S. Pat. No. 5,159,887 issued on Nov. 3, 1992.

The present invention pertains to a plant transplanter and more particularly to a mechanical plant transplanter which is especially adapted for use with small and large leafed plants.

When transplanting plants, it is important that they be planted without damaging the leaves, stems or roots. Additionally, it is important to have the plants placed at a uniform depth and spacing so that the maximum number of plants may be planted in a field and still thrive. It is also important that the planter mechanism itself not jam or otherwise interfere with the transplanting process.

Mechanical transplanters are known which enable a large number of plants to be planted in a field in a relatively short time frame, and at regular intervals. With known transplanters, however, it is difficult to transplant large leafed plants without damaging them. One prior art transplanter is disclosed in U.S. Pat. No. 4,290,373, entitled SEEDLING TRANSPLANTER. This transplanter includes a rotating tray with a pair of doors at the bottom of each cup for discharging plants from said cup into square transporter, and including a kicker at the bottom of the transporter. This transplanter is not reliable as plants becomes jammed at the location where the kicker meets the bottom of the square shoot for discharging plants from a furrow opening shoe. Additionally, the cup and doors arrangement disclosed in this patent does not adequately position plants over the transporter to prevent damage to large plants. Other known transplanters also damage plants as they pass through the planting mechanism, which is especially a problem for large leafed plants. Consequently, workers must manually replace damaged plants which have been planted by the mechanical transplanter.

Transplanters typically include a shoe which cuts a furrow in which plants are placed by the planting mechanism. Known shoes accumulate dirt thereon which widen the furrow, rendering planting unreliable. One prior art solution which avoids dirt accumulation on the shoe has a polymeric surface to which dirt does not stick. However, known furrow opening shoes having a polymer surface material wear prematurely and thus are relatively expensive to maintain.

The present invention embodies a furrow opening shoe for a plant transplanter.

The operation of the transplanter is greatly enhanced by a novel shoe for forming the furrow in which the plants are deposited. This invention relates to such shoe having a polymeric layer mounted on the outer surface thereof which contacts and cuts into the soil. The layer is protected by providing a shoulder located along an edge of such layer that prevents the soil from peeling the layer away from the outer surface of the shoe. These and other objects, advantages, and features of the invention will become apparent upon review of the following specification in combination with the drawings.

BRIEF DESCRIPTION OF THE DRAWINGS

FIG. 6 is a sectional side view of the furrow opening shoe, ejector, and a cup taken along plane VI—VI of FIG. 2;

FIG. 7 is a perspective of a polymer furrow opening shoe according to the invention;

FIG. 9 is a perspective of the transplanter with the cup assembly removed; and

DETAILED DESCRIPTION OF THE PREFERRED EMBODIMENT

Figure 1:
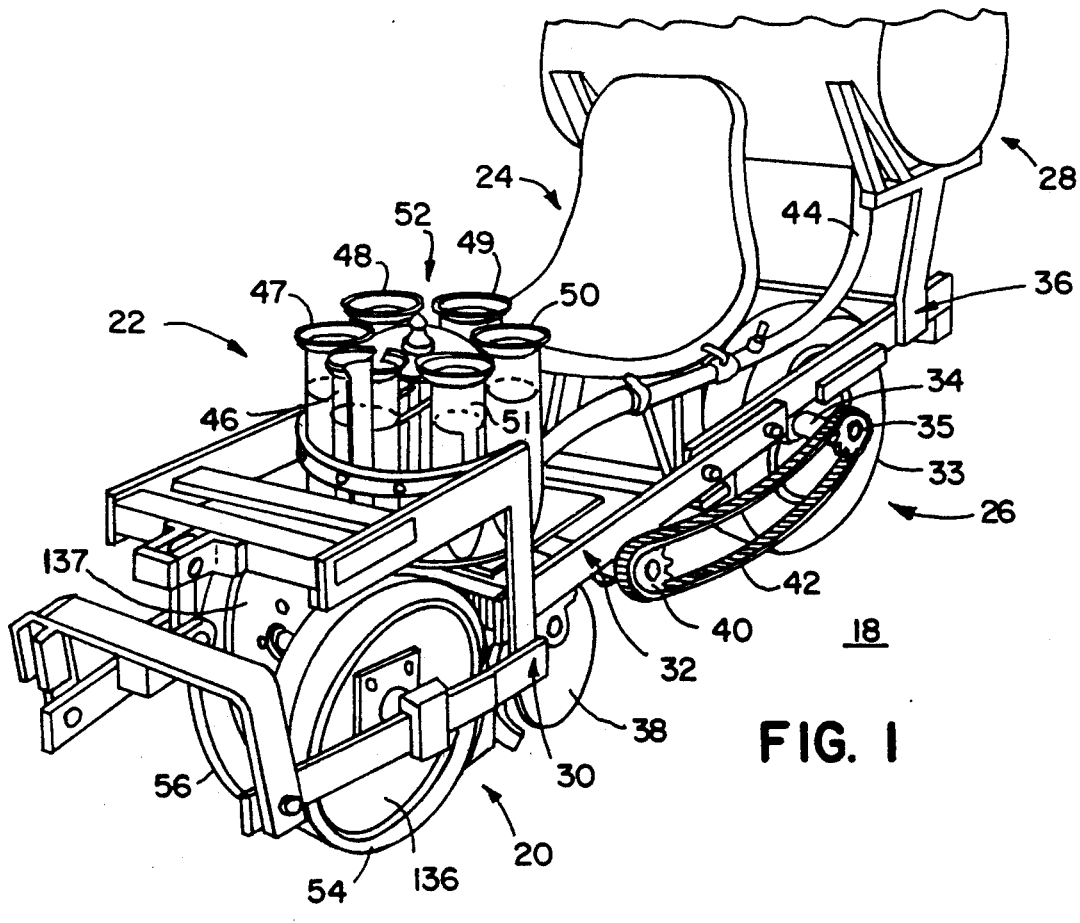
FIG. 1 is a perspective view of a plant transplanter according to the invention.

Referring now specifically to the drawings and the illustrated embodiments depicted therein, and particularly FIG. 1, plant transplanter 18 comprises packing wheel assembly 20 (and proceeding left to right), planting mechanism 22, operator station 24, front wheel drive assembly 26, and water tank 28. Packing wheel assembly 20 is carried by packing wheel frame 30. Operator station 24, as well as the transplanter mechanism 22, are carried by the central frame 32. Water tank 28 and front wheel drive assembly 26, having a wheel 33, an axle 34, and a sprocket 35, are carried by a front frame 36. The three frames 30, 32, and 36, are attached to one another to form the frame for transplanter 18. Central frame 32 further carries a disk 38 which breaks soil in front of planting mechanism 22, and a sprocket 40, which is coupled to sprocket 35 by chain 42 for rotation therewith. A transplanter operator sits at operator station 24 and places plants into cups 46-51 of cup assembly 52 as it rotates. Packing wheels 54 and 56 pack dirt around plants which are ejected from plant mechanism 22, as described in greater detail below. Water is supplied from water tank 28 to the transplanter mechanism 22 via hose 44.

Figure 2:
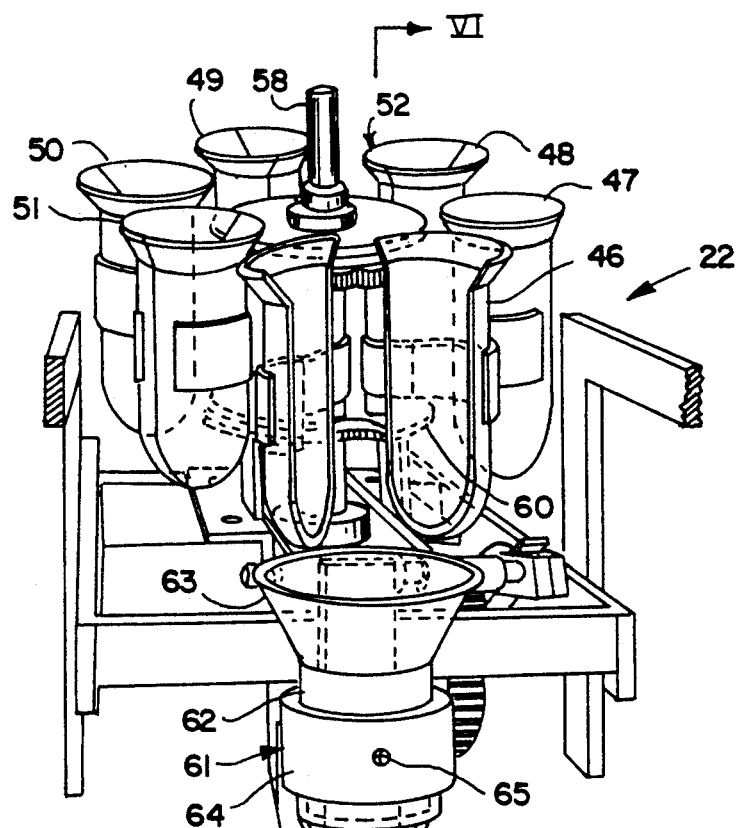
FIG. 2 is a perspective view of a cup assembly and ejector according to the invention.

Planting mechanism 2 is illustrated in greater detail in FIG. 2. The planter mechanism includes cup assembly 52 comprising the six cups 46-51 which rotate with shaft 58. Each cup is approximately 12 inches long so that six to eight inch plants may be received therein. Accordingly, the entire foliage of the plant is held within the cup, which protects the plant from damage during planting. As the cup assembly 52 rotates, five of the cups will be held closed by cam 60, as described below in further detail, and one cup is open over ejector 61. Ejector 61 includes a transporter cup or chute 62 which is carried by kick plate and ring 64, whereby plants are reliably discharged without getting hung-up as prior art planting mechanisms typically do. Chute 62 has an upper flared top 63 forming a funnel portion. At the lower end the chute 62 is cut away. Chute 62 is secured to kick plate and ring 64 by screws 65 and 66. The chute and kick plate are positioned within the shoe assembly 68 which includes a channel iron bottom piece 70, a pair of metal sidewalls 72 and 74, and polymer outer layers 76 and 78. Outer layers 76 and 78 prevent dirt from building up on the shoe as a furrow is dug, and thus maintains a narrow, uniform furrow width, which insures reliable planting by planting mechanism 22.

Figure 3:
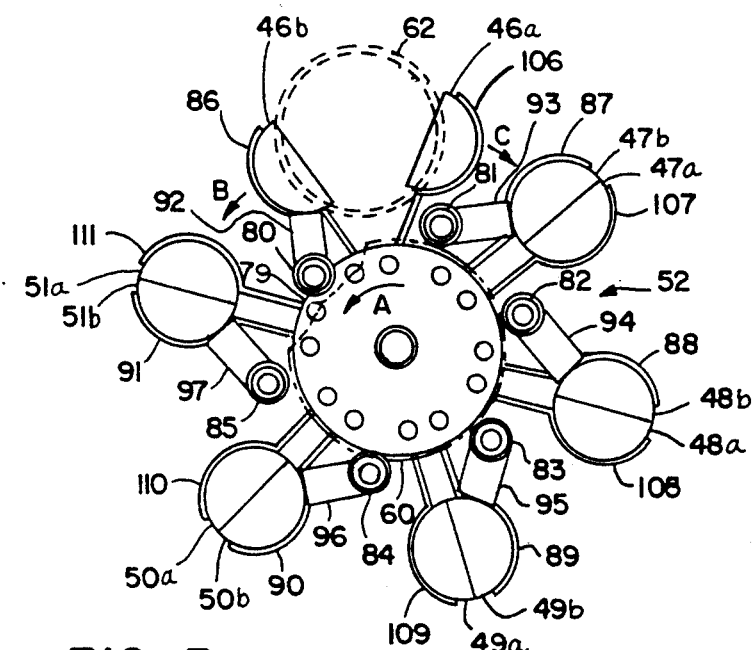
FIG. 3 is a bottom view of a cup assembly according to the invention.
Figure 5:
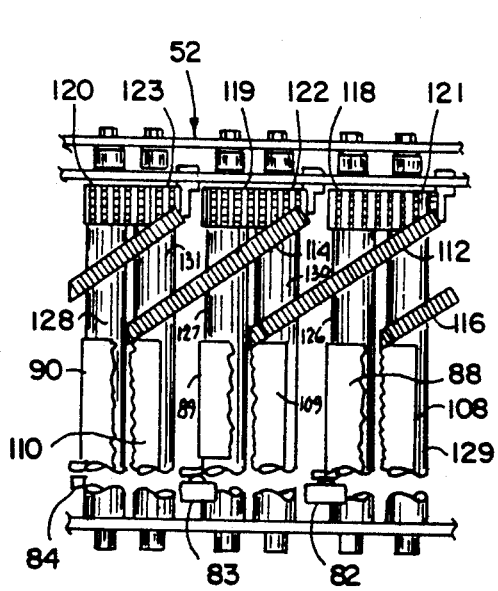
FIG. 5 is a side view of the cup assembly according to the invention with the cups removed.
Figure 4:
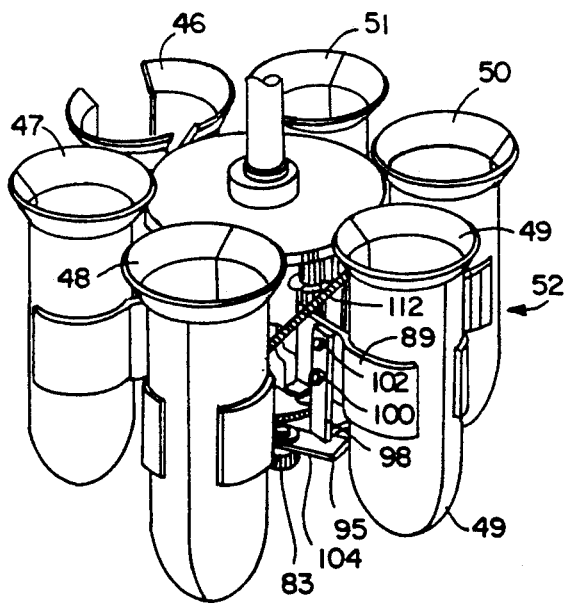
FIG. 4 is perspective of a cup assembly according to the invention.

Cup assembly 52 is shown in further detail in FIGS. 3, 4 and 5. Cups 46-51 each comprise two half shells 46a-51b which are held in a closed or open position by rollers 80-85, respectively. When rollers 80-85 are positioned against the full diameter of cam 60, the cups will be closed. When rollers 80-85 are positioned within detent 79 of cam 60, the respective cup will be open. Because the cut-a-way portion 79 is approximately one-sixth of the circumference of the cam, the cups will be open approximately one-sixth of the time. In order for the cup assembly 52 to rotate continuously, rollers 80-85 must make a smooth transition from detent 61 to the full diameter portion of cam 60. Accordingly, detent 79 should be formed such that it does not interfere with the rotation of rollers 80-85 cam 60. Additionally, detent 79 should be positioned such that cups 46-52 open over chute 62.

Each roller 80-85 is affixed to one of the half shells 46b, 47b, 48b, 49b, 50b, and 51b by respective plates 86-91, which in turn carry respective brackets 92-97, having rollers 80-85 thereon. As illustrated in FIG. 4, the brackets 92-97 include two orthogonal sections, one section 98 being affixed by nuts and bolts 100 and 102 to plate 89, and the other section 104 carrying roller 83. As illustrated in FIG. 3, halves 46a, 47a, 48a, 49a, 50a, and 51a of the clam shell cups are carried by plates 106-111, respectively. Each of the plates 106-111 is connected to a spring 112 (FIG. 4) which biases the clam shell rollers 80-85, against cam 60. The relationship between the clam shell halves is illustrated in FIG. 5, wherein it can be seen that each of plates 88-90 have rollers 82, 83 and 84, respectively, carried thereon, and each of plates 108-110 are coupled to respective springs 116, 112 and 114 which bias the respective plates 108-110 toward the open position. Each of the plates 88, 89, 90, 108, 109 and 110 are coupled to respective gears 118-123 by respective axles 126-131, such that the respective cup halves 46a-51b move together, and at the same speed. Thus, when roller 83 moves into detent 61 of cam 60, spring 112 will pull the clam shell halves 49a and 49b apart by biasing roller 83 against detent 61, and plates 89 and 109 will move open together as gears 119 and 122 rotate together. The two gear construction provides equal movement of the two halves of each cup, and thus provides a large opening between the cup halves, providing more room for the plants to drop into the transporter cup and thus preventing plants from hanging on the top of the transporter cup.

As illustrated in FIG. 6, ejector 61, comprising kick plate 64 and chute 62, pivots around axle 124. Plants are discharged from cup 46 as roller 80 passes through detent 61 and they fall through the funnel portion of chute 62 to lower portion 126 of ejector 61, which is positioned in shoe assembly 68. As the plant falls through chute 62, kick plate 64 moves to the discharge position illustrated in phantom lines in FIG. 6 whereby the plants are moved into appropriate planting position for packing by packing wheels 54 and 56 (FIG. 1). Because the chute and kick plate move together, jamming of plants is avoided. Also, the distance from the bottom of cups 46-51 is significantly reduced. Both of these features increase the planting efficiency by decreasing manual replanting of incorrectly planted seedlings.

The polymer furrow opening shoe 68 is further illustrated in FIGS. 6 and 7 and includes a spade 128 located on the front of the furrow opening shoe assembly. A front polymeric outer surface 130 is provided behind spade 128 in addition to the polymer surfaces 76 and 78 (FIG. 2). As illustrated in FIGS. 2 and 7, channel iron piece 70 extends from the front to the back of the furrow opening shoe. As further illustrated in FIG. 6, a polymer material layer 130 is positioned in front of a metal piece 132. The metal piece provides strength for the polymeric material so that it is not damaged during furrowing. The polymer layer is preferably ultra high molecular weight plastic.

The furrow opening shoe 68 is illustrated in a box-like form including channel iron bottom 70 having lips, or shoulder, 70a and 70b behind which the polymer material 76 and 78 are secured, and having washer and bolts 234 and 236, or other fastening means, at the top of the shoe, whereby said polymer layer is secured to the metal shoe. However, any type of shoe may be advantageously modified to include a polymeric layer and a projection ridge to prevent debris from harming the polymeric layer during furrowing. Furthermore, although polymeric surface furrow opening shoes are known, they do not include such projection ridge and consequently the polymer surface is easily damaged on such prior shoes.

Figure 8:
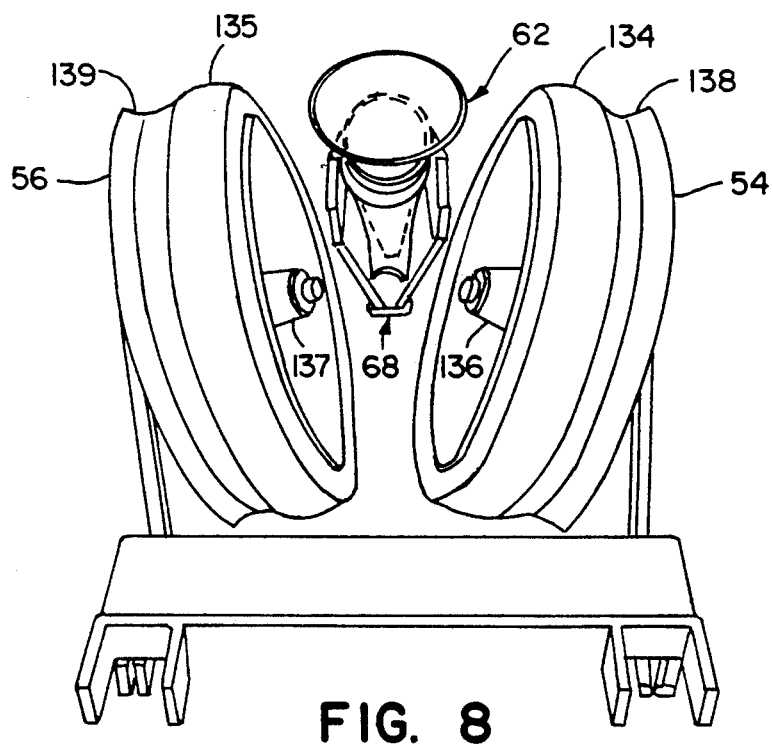
FIG. 8 is a perspective view of the packing wheels and the furrow opening shoe according to the invention.

Packing wheels 54 and 56 are further illustrated in FIG. 8. Packing wheels 54 and 56 are positioned behind furrow opening shoe assembly 68 and include zero pressure outer tires 134 and 135 and wheels 136 (FIG. 1) and 137, respectively. Packing wheels 54 and 56 are preferably angled toward one another at the back, and thus are wider near the furrow opening shoe assembly 68 than they are at the back. The angle of the wheels assists the packing wheels in packing soil around the plants as they are discharged from the furrow opening shoe by ejector 61. The packing wheels also include flares 138 and 139, respectively, which direct soil toward the inside of the wheels and thus toward the point where the plants exit shoe 68. Outer tires 134 and 135 are preferably made from synthetic rubber and include openings (not shown) to maintain zero pressure therein. By providing zero pressure tires 134 and 135 having flares 138 and 139, packing wheels 54 and 56 are flat where they engage the ground and effectively roll soil around the plants and eliminate air pockets around the roots.

Front wheel drive assembly 26 (FIG. 1) includes drive wheel 33 keyed to rotate axle 34 and sprocket 35, which in turn is connected to drive sprocket 40 via chain 42. Sprocket 40 is coupled to sprocket 142 (FIG. 9) by axle 140 whereby sprockets 40 and 142 rotate together. Sprocket 142 is in turn coupled to sprocket 144 by chain 146. Sprocket 144 is keyed to shaft 148, which is coupled through 90° translation box 150, whereby shaft 58, projecting through cam 60, and seventy-two teeth gear 152, rotate at substantially the same speed. The 90°. translation box or gear reducer 150 may contain a beveled gear or differential therein, whereby shaft 58 and 72-teeth gear 152 will rotate at substantially the same rate. A 12-teeth gear 154 is keyed to rotate at six times the rate of 72-teeth gear 152, whereby ejector 61 ejects plants into the furrow created by shoe assembly 68 (FIG. 2) each time a plant is discharged from cups 46-51. The rate at which shaft 58 and 72-teeth gear 152 rotate is set by the rate at which transplanter 18 is pulled and the size of sprockets 35, 40, 142, and 144. Thus by changing the size of the sprockets, the speed with which the cup assembly 52 rotates may be adjusted.

Figure 10:
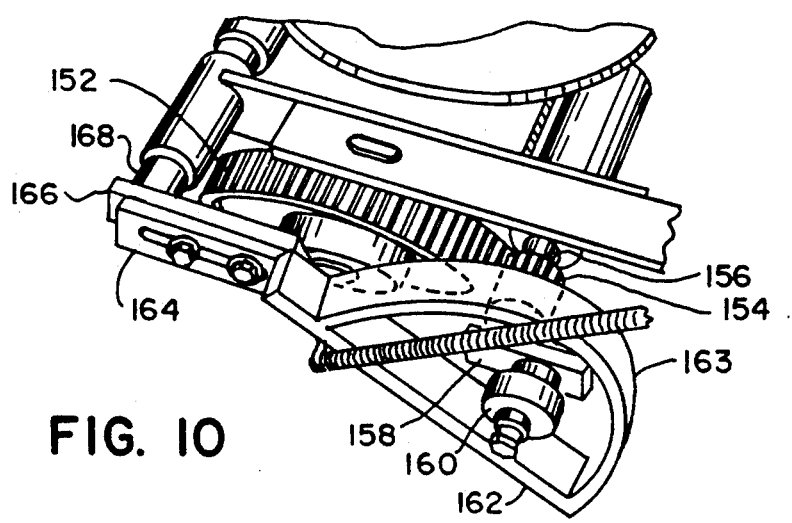
FIG. 10 is a perspective of a drive mechanism for the kick plate according to the invention.

As seen in FIG. 10, 72-teeth gear 152 is connected to a 12-teeth gear 154 whereby shaft 156 rotates at a rate six times faster than the 72-teeth gear. Shaft 156 and gear 154 are connected to rotate plate 158 with roller 160 displayed thereon. As roller 160 rotates eccentrically with shaft 156, D-shaped member 162 is displaced such that D-shaped member 162, bracket 164, and plate 166 all rotate around shaft 168. Shaft 168 is in turn keyed to kick plate 64, as illustrated in FIG. 6, whereby kick plate 64 and chute 62 will be pivoted between the vertical and eject positions six times during each rotation of 72-teeth gear 152. If ejector 61 (FIG. 2) is out of position such that half circle portion 163 of D-shaped member 162 is pulled against roller 160, roller 160 will push the half circle 163 whereby ejector 61 will be returned to a normal operating position.

OPERATION

In operation, as transplanter 18 is pulled by a tractor or other means, front wheel 33 rotates axle 34 and socket 35, which in turn rotate chain 42, sprocket 40, sprocket 142, chain 146, and sprocket 144. Rotation of sprocket 144 causes shaft 148 to rotate which, in turn, controls shafts 58 and 72-teeth gear 152 to rotate. Shaft 58 is keyed to cup assembly 52, cup assembly 52 rotating in either a clockwise or a counterclockwise direction, as desired, and set by translation box 150, for receiving plants in cups 46-51. As rollers 80-85 come into contact with detent 79 of cam 60, respective cups 46-51 open to discharge plants held therein. Cups 46-51 have flared tops so that large leafed plants may be received therein without being damaged.

Referring to FIG. 3, as cup assembly 52 rotates counterclockwise, as illustrated by arrow A, shell half 46b moves counterclockwise, as illustrated by arrow B, and cup half 46a moves clockwise, as illustrated by arrow C. The cup halves will open at a rate substantially equal to the rotational rate of the cup assembly 52, and thus shell half 46a will remain over chute 62, while the plant is being discharged and the opening between the cup halves will remain positioned over chute 62. Chute 62 (FIG. 2) includes a flared top which receives plants from cup assembly 52 and does not damage the plants as they pass therethrough. Additionally, kick plate 64 and chute 62 move together to position plants outside of the furrow opening shoe assembly 68. Because chute 62 and kick plate 64 of ejector 61 move together, they will not jam, which significantly reduces the stop and start time required for replacing plants when the mechanical planter jams. As indicated above, kick plate 64 ejects plants six times for every rotation of cup assembly 52 because of 72-teeth gear 152 and 12-teeth gear 154. Thus, as each cup 46-51 drops a plant through chute 62, the kick plate 64 will move from a vertical position to the discharge position (illustrated in phantom in FIG. 6). After the plant is discharged from shoe assembly 68, packing wheels 54 and 56 will pack down soil around the plants. Because packing wheels 54 and 56 are zero pressure tires having flared outer portions for pushing soil from the outside to the inside of the respective wheels, the tires provide excellent packing. The zero pressure tire advantageously provides flat contact with the ground for improved packing without leaving air pockets around roots.

It can thus be seen that a more versatile transplanter is disclosed which provides improved operation for transplanting large and small plants alike. It will become apparent to those skilled in the art that various modifications to the preferred embodiments described and disclosed herein can be made, which modifications will, however, fall within the spirit or scope of the invention as defined by the appended claims.

The embodiments of the invention in which an exclusive property or privilege is claimed are defined as follows.

1. A furrow opening shoe for a plant transplanter for planting seedlings including means for transporting said seedlings into a planting position, said furrow opening shoe comprising:
    a shoe frame including a bottom member; and
    at least one polymer outer layer positioned over a portion of said shoe frame whereby said shoe does not accumulate dirt thereon and wherein said frame includes at least one slot which receives said at least one polymer outer layer, each said slot formed between said portion of said shoe frame over which said polymer outer layer is positioned and an outer lip of said bottom member such that at least a bottom portion of the perimeter of said polymer outer layer is received in said slot whereby said bottom member protects said polymer outer layer during furrowing.

2. The furrow opening shoe as defined in claim 1, wherein said polymer outer layer consists of high molecular weight plastic and said bottom member comprises an angle iron member.

3. A furrow opening shoe for a plant transplanter for planting seedlings including means for transporting said seedlings into a planting position, said furror opening shoe comprising:
    a frame including a projecting shoulder;
    a polymer outer layer which does not accumulate dirt thereon, said polymer outer layer carried over a portion of said frame and including an outer surface; and
    wherein said projecting shoulder projects from said frame adjacent said polymer outer layer such that said shoulder projects at least to the outer surface of said polymer layer along the bottom of the shoe, and said projecting shoulder of said furrow opening shoe including slots receiving a bottom edge of said polymer outer layer, said slots formed between said portion of said frame over which said polymer layers are positioned and outer lips of said shoulder whereby said projecting shoulder prevents soil or debris from separating the polymer outer layer from said frame during furrowing.

4. The furrow opening shoe as defined in claim 3, wherein said polymer outer layer consists of a high molecular weight plastic and said projecting shoulder consists of metal.

5. A furrow opening shoe for a plant transplanter for planting seedlings including means for transporting said seedlings into a planting position, said furrow opening shoe comprising:
    a metal frame including a bottom member; and
    a polymer outer layer which does not accumulate dirt thereon, said polymer outer layer including perimeter edges, and said polymer outer layer positioned over at least a portion of said metal frame;
    wherein said bottom member provides strength along the bottom of said shoe, said bottom member forming a groove with said portion of said metal frame, said groove receiving at least a portion of said polymer outer layer therein whereby at least the bottom edge of said polymer outer layer is enclosed within said groove to prevent soil or debris from separating the outer layer from said frame during furrowing.

* * * * *

UNITED STATES PATENT AND TRADEMARK OFFICE
CERTIFICATE OF CORRECTION

PATENT NO. : 5,224,554
DATED : July 6, 1993
INVENTOR(S) : Howard B. Poll

It is certified that error appears in the above-indentified patent and that said Letters Patent is hereby corrected as shown below:

column 1, line 52: before paragraph "The present invention . . ." insert the heading --SUMMARY OF THE INVENTION--;

column 2, line 47: "mechanism 2" should be --mechanism 22--;

column 3, line 17: after "80-85" insert --around--.

Signed and Sealed this

Tenth Day of May, 1994

Attest:

BRUCE LEHMAN

*Attesting Officer*   *Commissioner of Patents and Trademarks*